(12) United States Patent
Ho et al.

(10) Patent No.: US 8,806,230 B2
(45) Date of Patent: Aug. 12, 2014

(54) DATA STORAGE SYSTEM WITH POWER MANAGEMENT AND METHOD OF OPERATION THEREOF

(75) Inventors: Jenhao Ho, Milpitas, CA (US);
Lakshmi Narasimhan Sundararajan, San Jose, CA (US); Andrew Chi-Te Huang, San Jose, CA (US);
Cherng-Ren Sue, San Jose, CA (US)

(73) Assignee: Promise Technology, Inc., Milpitas, CA (US)

( * ) Notice: Subject to any disclaimer, the term of this patent is extended or adjusted under 35 U.S.C. 154(b) by 1158 days.

(21) Appl. No.: 12/642,755

(22) Filed: Dec. 18, 2009

(65) Prior Publication Data

US 2011/0154072 A1    Jun. 23, 2011

(51) Int. Cl.
*G06F 1/00* (2006.01)
(52) U.S. Cl.
USPC ........... 713/300; 713/310; 713/320; 713/321; 713/322; 713/323; 713/324; 713/330; 713/340
(58) Field of Classification Search
USPC .................. 713/300, 310, 320–324, 330, 340
See application file for complete search history.

(56) References Cited

U.S. PATENT DOCUMENTS

| | | | |
|---|---|---|---|
| 7,254,732 B2 | 8/2007 | Bashford et al. | |
| 7,441,130 B2 * | 10/2008 | Isobe et al. | 713/300 |
| 7,509,444 B2 * | 3/2009 | Chiu et al. | 710/51 |
| 2006/0101171 A1 | 5/2006 | Grieff et al. | |
| 2006/0224801 A1 * | 10/2006 | Chiu et al. | 710/70 |
| 2007/0006001 A1 * | 1/2007 | Isobe et al. | 713/300 |
| 2007/0255900 A1 | 11/2007 | Lee et al. | |
| 2009/0133040 A1 | 5/2009 | Stevens, IV | |
| 2009/0172206 A1 | 7/2009 | Hall, IV et al. | |
| 2009/0271640 A1 * | 10/2009 | Sakagami et al. | 713/300 |

\* cited by examiner

*Primary Examiner* — M Elamin
(74) *Attorney, Agent, or Firm* — Ishimaru & Associates LLP

(57) ABSTRACT

A method of operation of a data storage system includes: providing a standby power source; detecting activity on a communication channel with an upstream re-driver powered with the standby power source; generating a signal-detect output from the upstream re-driver based on the activity; determining a link status with a power control unit based on the signal-detect output, the power control unit powered with the standby power source; and generating a power output from a power supply unit based on the link status, the power supply unit controlled by the power control unit.

10 Claims, 3 Drawing Sheets

DATA STORAGE SYSTEM WITH POWER MANAGEMENT AND METHOD OF OPERATION THEREOF

TECHNICAL FIELD

The present invention relates generally to a data storage system, and more particularly to a system for a data storage system with power management.

BACKGROUND ART

All major enterprises (business entities) are currently trying to remain competitive by implementing new information technologies (IT) to help them drive their businesses. These information technologies range from the personal computers (PCs), which are being placed on every employee's desktop, down to their new web servers for providing information to their customers. Many of the requirements of these new technologies require data processing systems with the storage of more and more data.

The development of the data processing systems has begun to focus on the amount of electrical power consumed rather than solely on more traditional aspects such as the volume of data stored, the speed at which operations are completed, or the flexibility of the types of operations which can be performed. The issue of power management is even more critical in larger scale data processing systems such as supercomputers, massively parallel processing systems, server data processing system "farms", and rack servers.

Each server data processing system module typically includes a separate power supply element and consequently, as the number of modules in a rack server increases, the amount of power consumed can increase disproportionately as compared with a rack server including a smaller number of larger modules. Electrical power consumption in such power-dense rack servers can be so great that a single power input/source, server farm, or data center can be unable to provide sufficient power to operate all modules as needed.

While power management techniques can result in a reduction in the amount of power consumed, they either require explicit user input which may not accurately reflect the power consumption needs of a data processing system affected or operate completely and independently of data processing system power requirements based upon external events. Moreover, such power management techniques provide no manner to coordinate the power consumption of multiple data processing systems, which depend on a single power input or source.

Thus, a need still remains for a data storage system with power management. In view of the ever-increasing need to improve power savings, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a data storage system including: providing a standby power source; detecting activity on a communication channel with an upstream re-driver powered with the standby power source; generating a signal-detect output from the upstream re-driver based on the activity; determining a link status with a power control unit based on the signal-detect output, the power control unit powered with the standby power source; and generating a power output from a power supply unit based on the link status, the power supply unit controlled by the power control unit.

The present invention provides a data storage system, including: a standby power source; an upstream re-driver, powered with the standby power source, for detecting activity on a communication channel and generating a signal-detect output; a power control unit, coupled to the upstream re-driver, for determining a link status based on the signal-detect output, the power control unit powered with the standby power source; and a power supply unit, coupled to the power control unit, for generating a power output based on the link status, the power supply unit controlled by the power control unit.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
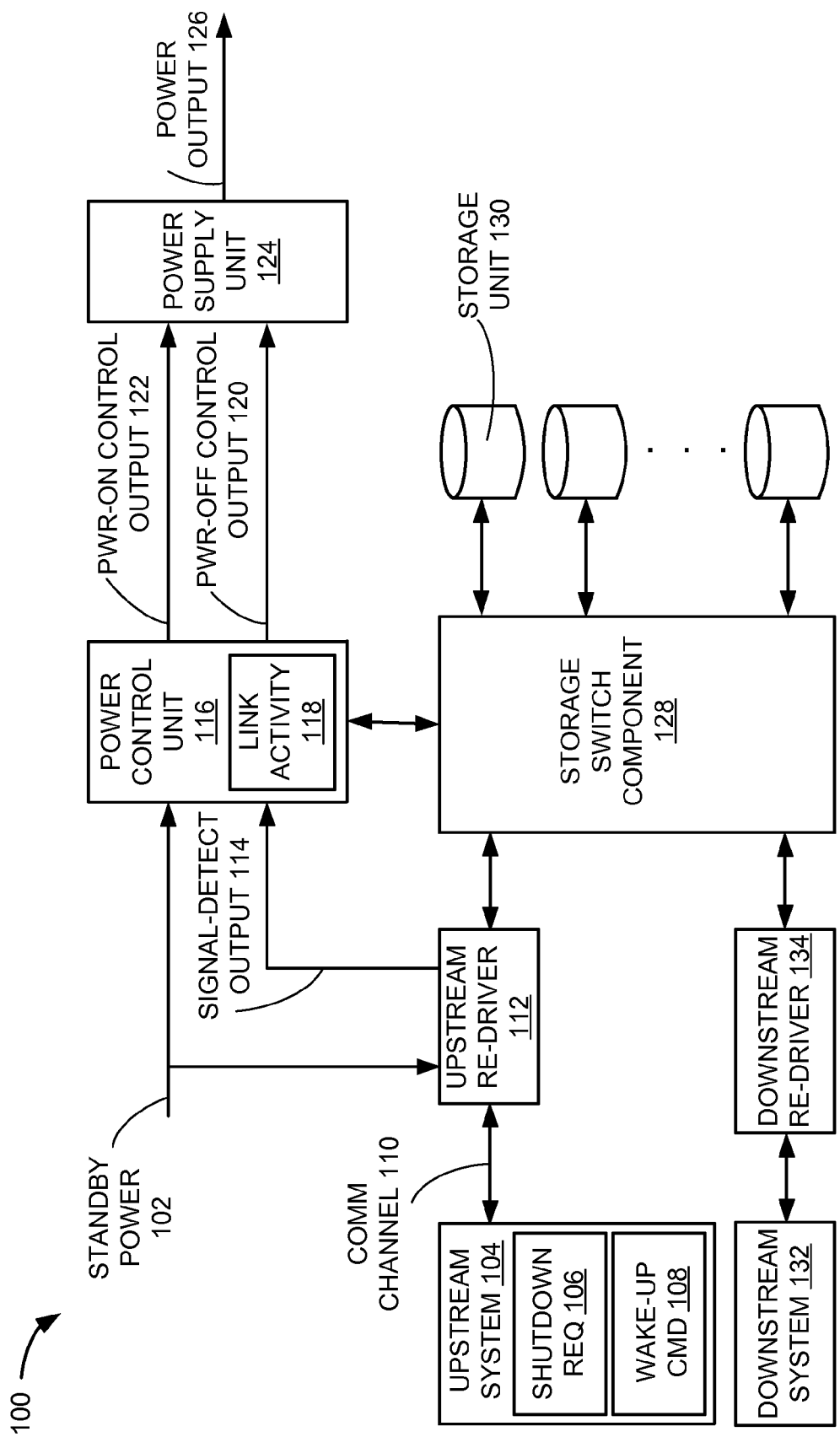
FIG. 1 is a schematic block diagram of a portion of a data storage system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Referring now to FIG. 1, therein is shown a schematic block diagram of a portion of a data storage system 100 in an embodiment of the present invention. The data storage system 100 can include a Serial Attached Small Computer System Interface (SAS) controller, a Just a Bunch of Disks (JBOD) controller, a SAS JBOD controller, or a storage controller.

The data storage system 100 can include a standby power source 102, such as a power supply that powers a component in a standby or shutdown phase. The standby power source 102 can be required to always be on. The component powered or supplied with the standby power source 102 can include a circuit, a chip, a control unit, or any circuitry that remains active in the standby or shutdown phase. The standby or shutdown phase can include a phase in which a portion of a storage system is powered down or off to conserve energy. The standby power source 102 can be provided with or through a voltage translator.

The data storage system 100 can include an upstream system 104, which can represent a system that can provide high level of data reliability, increased input/output performance, connectivity between a host system (e.g. a host, an initiator, an server, or a switch) and a target system (e.g. a target, a storage device, a disk drive, or a JBOD), or a combination thereof. For example, the upstream system 104 can include a redundant array of independent disk (RAID) head, a SAS host bus adapter (HBA), a host controller, or an upstream JBOD.

The upstream system 104 can send or initiate a shutdown request 106, such as a request to inform downstream components to prepare for an up-coming shutdown mode or a power-down mode. The upstream system 104 can send or initiate a wake-up command 108, such as a control to inform the downstream components to prepare for an upcoming wake-up mode or a power-up mode.

The upstream system 104 can send or transmit its activity over a communication channel 110, which can include a differential signal, an interface wire, a bus, any high-speed signal transmission protocol, or any combination thereof. The activity is a form or a state of operation over the communication channel 110. The activity can represent the shutdown request 106, the wake-up command 108, or any information sent from the upstream system 104 to a downstream device.

The communication channel 110 can include a physical medium, such as a cable or a point-to-point transmission channel that provides a high-speed serial communication link between devices. Data can be transmitted via the communication channel 110 with a storage interface, such as SAS or an interface for interconnecting a storage controller and a storage device.

The data storage system 100 can include an upstream re-driver 112, such as a re-driver chip, a repeater, a physical layer (PHY) chip, or a transceiver. The upstream re-driver 112 can recover, boost, or a combination thereof a signal received from a long trace or cable.

The upstream re-driver 112 can be coupled to the upstream system 104 by connecting the communication channel 110 to the upstream system 104 and the upstream re-driver 112. The upstream re-driver 112 can be powered or supplied with the standby power source 102.

The upstream re-driver 112 can receive or transmit data from or to the upstream system 104, respectively, via the communication channel 110. The upstream re-driver 112 can detect activity of the upstream system 104 on the communication channel 110.

The upstream re-driver 112 can preserve or recover the integrity of the activity by boosting or re-establishing full output levels before re-transmitting the activity. The upstream re-driver 112 can compensate for a jitter or an insertion loss caused by the trace or the cable, thereby providing the integrity of the activity received via the communication channel 110 at an end of the long trace or the cable.

The upstream re-driver 112 can generate a signal-detect output 114 based on the activity on the communication channel 110, for indicating that the activity received via the communication channel 110 is detected. The activity can be detected with the upstream re-driver 112 having an amplitude detection mechanism.

The activity can be detected as off. For example, the activity having an amplitude less than or equal to a predetermined peak-to-peak amplitude is detected as off. With the activity detected as off, the signal-detect output 114 can be de-asserted or changed to an inactive state.

The activity can be detected as on. For example, the activity having the amplitude more than the predetermined peak-to-peak amplitude is detected as on. With the activity detected as on, the signal-detect output 114 can be asserted or changed to an active state.

The data storage system 100 can include a power control unit 116 for controlling a system power. The system power can supply power to a portion of the data storage system 100 in a normal operation. The power control unit 116 can be coupled to the upstream re-driver 112. The power control unit 116 can be powered or supplied with the standby power source 102.

The power control unit 116 can determine a link status 118 of the upstream system 104. The power control unit 116 can monitor the signal-detect output 114 to determine the link status 118. With the signal-detect output 114 de-asserted, the power control unit 116 can determine or detect that the link status 118 is inactive. With the signal-detect output 114 asserted, the power control unit 116 can determine or detect that the link status 118 is active.

The power control unit 116 can generate a power-off control output 120 for disabling or powering off the system power. With the link status 118 being inactive, the power control unit 116 can assert the power-off control output 120. The power control unit 116 can generate a power-on control output 122 for enabling or powering on the system power. With the link status 118 being active, the power control unit 116 can assert the power-on control output 122.

The data storage system 100 can include a power supply unit 124 for providing the standby power source 102, a power output 126, or a combination thereof. The power output 126 can represent a direct current (DC) output. The power output 126 can supply power to a portion of the data storage system 100 in a normal operation. The power output 126 can be different than the standby power source 102. The power supply unit 124 can be coupled to the power control unit 116.

The power output 126 can be generated with the power supply unit 124. The power-off control output 120 can be sent to the power supply unit 124. With the power-off control output 120 asserted, the power supply unit 124 can de-assert or change a state of the power output 126 to off, thereby disabling the system power. The power-on control output 122 can be sent to the power supply unit 124. With the power-on control output 122 asserted, the power supply unit 124 can assert or change the state of the power output 126 to on, thereby enabling the system power.

The data storage system 100 can include a storage switch component 128, such as a SAS expander or a switch device, that facilitates communication between an initiator and a target or a storage device. The storage switch component 128 can be powered or supplied with the power output 126. The storage switch component 128 can be coupled to the upstream re-driver 112 and the power control unit 116.

The storage switch component 128 can receive or send data from or to the upstream system 104, respectively, via the upstream re-driver 112 in the normal operation. The storage switch component 128 can monitor the signal-detect output 114 or receive a state of the signal-detect output 114 through the power control unit 116.

The data storage system 100 can include a storage unit 130, such as a SAS drive, a Serial Advanced Technology Attachment (SATA) drive, a mass storage device, a hard disk drive, an optical drive, a solid state disk drive, or a combination thereof. The data storage system 100 can include any number of the storage unit 130. The storage unit 130 can be coupled or connected to the storage switch component 128 with a storage interface, such as SAS, SATA, or an interface for interconnecting a storage controller and a storage device.

The data storage system 100 can optionally include a downstream system 132, such as a JBOD, a downstream JBOD, a JBOD system, or a storage system, for providing storage capacity. The downstream system 132 can include any number of the JBOD, the downstream JBOD, or the JBOD system. The storage switch component 128 can facilitate communication between the upstream system 104 and the downstream system 132 or the storage unit 130.

The data storage system 100 can include a downstream re-driver 134, such as a re-driver chip, a SAS re-driver, a repeater, a physical layer (PHY) chip, or a transceiver. The downstream re-driver 134 can recover, boost, or a combination thereof a signal received from a long trace or cable. The downstream re-driver 134 can be coupled to the storage switch component 128 and the downstream system 132. The downstream re-driver 134 can be powered or supplied with the power output 126.

The downstream re-driver 134 can receive or transmit data from or to the downstream system 132, respectively. The storage switch component 128 can receive or send data from or to the downstream system 132, respectively, via the downstream re-driver 134 in the normal operation.

The downstream re-driver 134 can preserve or recover the integrity of an activity by boosting or re-establishing full output levels before transmitting the activity via a trace or a cable. The downstream re-driver 134 can compensate for a jitter or an insertion loss caused by the trace or the cable, thereby providing the integrity of the activity at an end of the long trace or the cable.

A shutdown procedure can be started with the upstream system 104 sending the shutdown request 106 to the storage switch component 128 as well as the downstream system 132. The shutdown request 106 can be sent via the upstream re-driver 112 to the storage switch component 128 or via the upstream re-driver 112, the storage switch component 128, and the downstream re-driver 134. With the storage switch component 128 prepared for the shutdown mode, the power control unit 116 can be instructed to monitor the signal-detect output 114.

With the link status 118 being active, the power control unit 116 can monitor the link status 118 to look for a state transition in the link status 118 changed from active to inactive. The power control unit 116 can assert the power-off control output 120 to de-assert the power output 126, thereby disabling or powering off the system power. At this point, the upstream re-driver 112 and the power control unit 116 can remain to be powered or supplied with the standby power source 102. The shutdown procedure can be completed with the system power disabled or powered off.

A wake-up procedure can be started with the upstream system 104 sending the wake-up command 108 downstream when it wakes up, causing the signal-detect output 114 of the upstream re-driver 112 to be asserted. For example, the wake-up command 108 includes an out-of-band (OOB) sequence, which can be represented by a series or intervals of on/off periods at a frequency that is different than a typical transmission frequency. Detecting that the signal-detect output 114 is asserted due to an active state of the link status 118, the power control unit 116 can assert the power-on control output 122 to re-enable or re-assert the power output 126, thereby enabling or powering on the system power.

The upstream system 104 can automatically send the wake-up command 108. Alternatively, the upstream system 104 can be controlled or commanded by a host system to send the wake-up command 108. The wake-up procedure can be completed with the system power enabled or powered on.

The downstream system 132 can include functions that are substantially the same or similar to the data storage system 100 or a subset thereof. The downstream system 132 can be provided with its own standby power source. The shutdown procedure or the wake-up procedure can be applied or repeated for shutting down or waking up, respectively, the downstream system 132.

The shutdown procedure can be initiated with the upstream system 104. To power down the downstream system 132, the upstream system 104 can inform the downstream system 132 to prepare for an upcoming shut-down. Then, the upstream system 104 can power down itself, resulting in no activity detected over the communication channel 110.

The wake-up procedure can be initiated with the upstream system 104. To power up the downstream system 132, the upstream system 104 can be powered up with a wake-up protocol. The wake-up protocol can include Wake-on Local-Area-Network (WoL) or a procedure that allows a computer, a computing system, or a storage system to be turned on or woken up by a network message.

It has been discovered that the present invention provides the wake-up procedure with low complexity. The wake-up procedure simply allows users or the upstream system 104 to remotely send the shutdown request 106 or the wake-up command 108 to the downstream system 132 that is to be powered down or woken up from a suspended state, respectively.

It has also been discovered that the present invention provides improved power savings. Power savings can be improved by powering off portions of the data storage system 100 that are not used or not required for service. System power can be managed by controlling the power output 126 with the upstream re-driver 112, the power control unit 116, and the power supply unit 124, which supplies the standby power source 102 to the upstream re-driver 112 and the power control unit 116. The system power can be managed based on the signal-detect output 114 and the link status 118 of the upstream system 104. De-asserting the power output 126 disables the system power until service is required.

Figure 2:
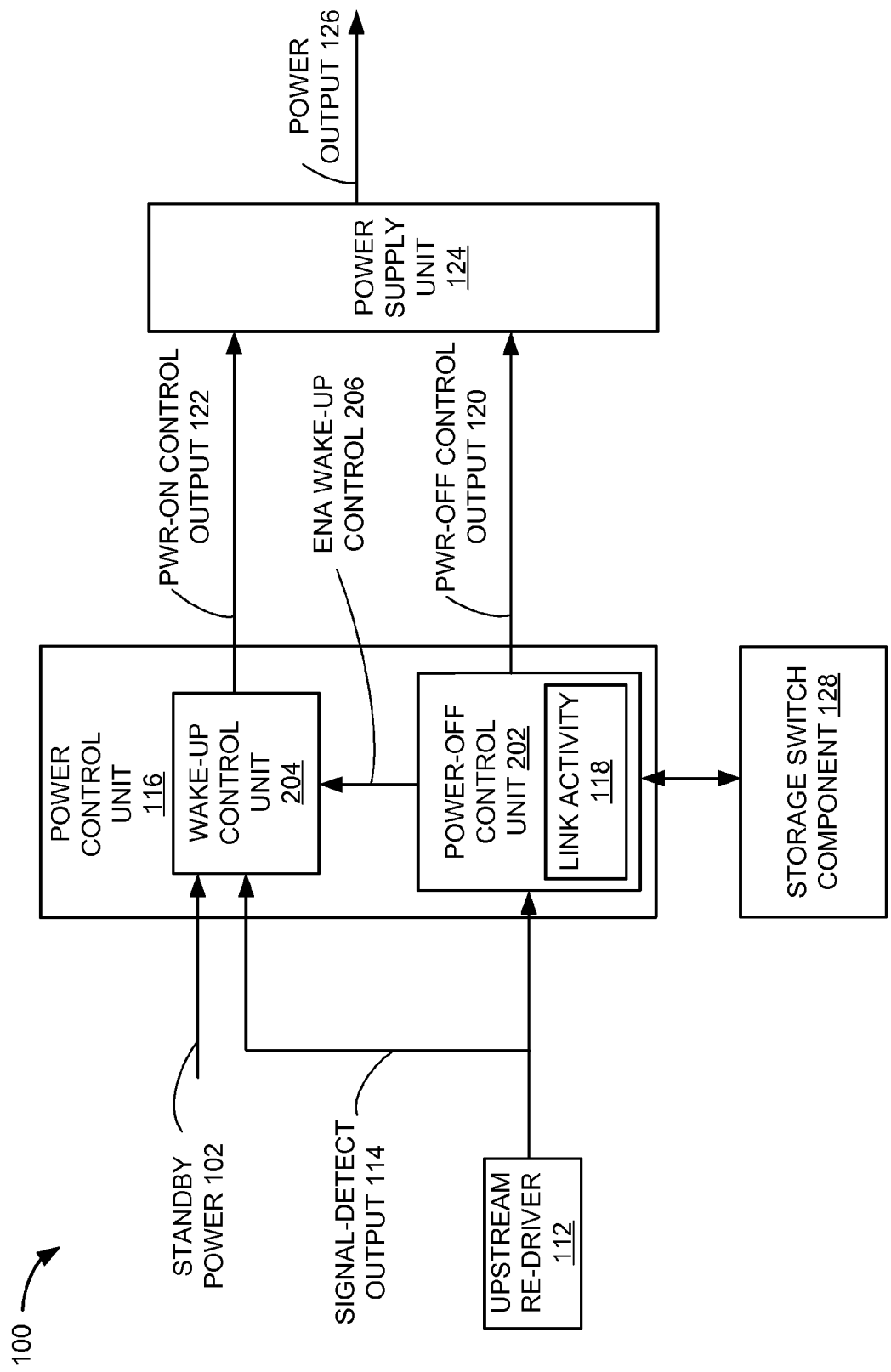
FIG. 2 is a schematic block diagram of the power control unit.

Referring now to FIG. 2, therein is shown a schematic block diagram of the power control unit 116. The data storage system 100 can include the power control unit 116 for controlling the power supply unit 124 that provides the system power, which can be supplied by the power output 126.

The power control unit 116 can include a power-off control unit 202, such as a complex programmable logic device (CPLD), a programmable array logic (PAL), or a field-programmable gate array (FPGA), for providing power control functions. The power-off control unit 202 can include on-board non-volatile memory, programmable logic, or a combination thereof.

The power-off control unit 202 can determine the link status 118 of the upstream system 104 of FIG. 1. The power-off control unit 202 can monitor the signal-detect output 114 driven by the upstream re-driver 112.

With the signal-detect output 114 de-asserted, the power-off control unit 202 can determine that the link status 118 is inactive. With the signal-detect output 114 asserted, the power-off control unit 202 can determine that the link status 118 is active.

The power-off control unit 202 can generate the power-off control output 120 sent to the power supply unit 124 for disabling or powering off the system power. With the link status 118 inactive, the power-off control unit 202 can assert the power-off control output 120. The storage switch component 128 can monitor the signal-detect output 114 or receive a state of the signal-detect output 114 through the power-off control unit 202.

For illustrative purposes, the power-off control unit 202 is described with functions for determining the link status 118 and generating the power-off control output 120, although it is understood that the power-off control unit 202 can include other logic or circuitry. For example, the other logic or circuitry can include additional functions for power management.

The power control unit 116 can include a wake-up control unit 204, such as a wake-up circuit, a wake-up control circuit, or any circuitry for controlling the system power. The wake-up control unit 204 can generate the power-on control output 122. The power-on control output 122 can be sent to the power supply unit 124 for enabling or powering on the system power. With the signal-detect output 114 active, the wake-up control unit 204 can assert the power-on control output 122. The wake-up control unit 204 can be powered or supplied with the standby power source 102.

With the link status 118 being inactive in a shutdown preparation mode, the power-off control unit 202 can generate an enable wake-up control 206 based on the link status 118. With the link status 118 inactive, the power-off control unit 202 can assert the enable wake-up control 206. The power-off control unit 202 can then assert the power-off control output 120.

The enable wake-up control 206 can be sent to the wake-up control unit 204. With the enable wake-up control 206 asserted, the wake-up control unit 204 can monitor the signal-detect output 114.

Detecting that the signal-detect output 114 changes from a de-asserted state to an asserted state in the shutdown mode, the wake-up control unit 204 can assert the power-on control output 122 to enable or power on the system power. Enabling or powering on the system power can wake up a portion of the data storage system 100 that has been shut down or powered down.

Figure 3:
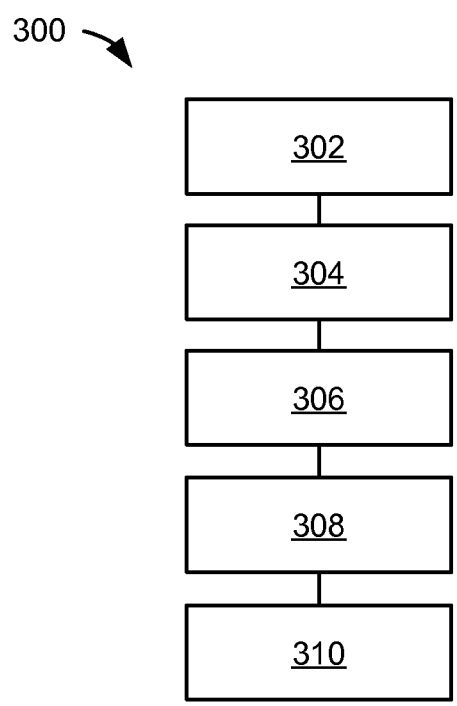
FIG. 3 is a flow chart of a method of operation of a data storage system in a further embodiment of the present invention.

Referring now to FIG. 3, therein is shown a flow chart of a method 300 of operation of a data storage system in a further embodiment of the present invention. The method 300 includes: providing a standby power source in a block 302; detecting activity on a communication channel with an upstream re-driver powered with the standby power source in a block 304; generating a signal-detect output from the upstream re-driver based on the activity in a block 306; determining a link status with a power control unit based on the signal-detect output, the power control unit powered with the standby power source in a block 308; and generating a power output from a power supply unit based on the link status, the power supply unit controlled by the power control unit in a block 310.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A data storage system comprising:
   a standby power source;
   an upstream re-driver, powered with the standby power source, for detecting activity on a communication channel and generating a signal-detect output;
   a power control unit, coupled to the upstream re-driver, for determining a link status based on the signal-detect output, the power control unit powered with the standby power source; and
   a power supply unit, coupled to the power control unit, for generating a power output based on the link status, the power supply unit controlled by the power control unit.

2. The system as claimed in claim 1 wherein the power control unit is for asserting a power-off control output for powering off the power supply unit based on the link status as inactive.

3. The system as claimed in claim 1 wherein the power control unit is for asserting a power-on control output for powering on the power supply unit based on the link status as active.

4. The system as claimed in claim 1 wherein the power control unit is for monitoring the signal-detect output.

5. The system as claimed in claim 1 further comprising:
   an upstream system, coupled to the upstream re-driver, for generating a wake-up command; and
   wherein:
   the upstream re-driver is for asserting the signal-detect output by the upstream re-driver based on the wake-up command.

6. The system as claimed in claim 1 wherein the power control unit includes:
   a power-off control unit powered with the standby power source; and
   a wake-up control unit powered with the standby power source.

7. The system as claimed in claim 6 wherein the power-off control unit is for asserting a power-off control output for powering off the power supply unit with the link status determined as inactive.

8. The system as claimed in claim 6 wherein the wake-up control unit is for asserting a power-on control output for powering on the power supply unit with the link status determined as active.

9. The system as claimed in claim 6 wherein the power-off control unit is for monitoring the signal-detect output.

10. The system as claimed in claim 6 further comprising:
    an upstream system for generating a wake-up command to the upstream re-driver; and
    wherein:
    the upstream re-driver is for asserting the signal-detect output based on the wake-up command; and the power control unit is for determining in the link status as active with the assertion of the signal-detect output.

* * * * *